(12) United States Patent
Shen et al.

(10) Patent No.: US 12,471,528 B2
(45) Date of Patent: Nov. 18, 2025

(54) IMAGE ACQUISITION DEVICE AND PROCESSING METHOD FOR AGRICULTURAL HARVESTING OPERATION MACHINE

(71) Applicant: FJ Dynamics Technology Co., Ltd, Xiangyang (CN)

(72) Inventors: Yong-Quan Shen, Xiangyang (CN); Bo Wang, Xiangyang (CN); Shun Fan, Xiangyang (CN); Di Wu, Nanjing (CN); Yuan Yao, Nanjing (CN); Xiao Zhang, Xiangyang (CN); Rui Chen, Xiangyang (CN)

(73) Assignee: FJ Dynamics Technology Co., Ltd, Xiangyang (CN)

( * ) Notice: Subject to any disclaimer, the term of this patent is extended or adjusted under 35 U.S.C. 154(b) by 1077 days.

(21) Appl. No.: 17/602,726

(22) PCT Filed: Mar. 20, 2020

(86) PCT No.: PCT/CN2020/080322
§ 371 (c)(1),
(2) Date: Oct. 8, 2021

(87) PCT Pub. No.: WO2020/207225
PCT Pub. Date: Oct. 15, 2020

(65) Prior Publication Data
US 2022/0167555 A1    Jun. 2, 2022

(30) Foreign Application Priority Data

Apr. 9, 2019 (CN) .......................... 201910280375.0
Apr. 9, 2019 (CN) .......................... 201920473543.3

(51) Int. Cl.
*A01B 79/00* (2006.01)
*A01D 41/02* (2006.01)
(Continued)

(52) U.S. Cl.
CPC .......... *A01D 41/127* (2013.01); *A01B 79/005* (2013.01); *G05D 1/0246* (2013.01)

(58) Field of Classification Search
CPC .. A01D 41/127; A01B 79/005; G05D 1/0246; B60R 1/00; B60R 1/27; B60R 2300/607; G06T 3/4038; H04N 23/698
See application file for complete search history.

(56) References Cited

U.S. PATENT DOCUMENTS 7,511,734 B2   3/2009  Ozaki
8,384,782 B2   2/2013  Hiroshi
(Continued)

FOREIGN PATENT DOCUMENTS

CN   105682446 A  * 10/2013  ........... A01B 69/001
CN   105682446       6/2016
(Continued)

OTHER PUBLICATIONS

CN105682446A—Machine Translation—Shouichi (Year: 2013).*
Machine translation of foreign reference: CN 105682446A—Shouichi (Year: 2013).*

*Primary Examiner* — Scott A Browne
*Assistant Examiner* — Rami Nabih Bedewi
(74) *Attorney, Agent, or Firm* — ScienBiziP, P.C.

(57) ABSTRACT

An image acquisition device and image processing method for an agricultural harvesting operation machine. The agricultural harvesting operation machine comprises a body and an image acquisition device; the image acquisition device comprises an image capturing component and a communication machine; the image acquisition device is mounted on the body; the communication machine is communicatably connected to the image capturing component so as to obtain acquired image information from the image capturing component, thereby assisting in adjusting the working position and operation speed of the body. Also provided is an image (Continued)

processing method. Information required by harvesting operation is taken into full consideration, images of the position of an agricultural harvesting operation machine are acquired, and multiple acquired images are efficiently processed.

14 Claims, 10 Drawing Sheets

(51) Int. Cl.
*A01D 41/127* (2006.01)
*G05D 1/00* (2006.01)

(56) References Cited

U.S. PATENT DOCUMENTS

2011/0072773 A1 3/2011 Schroeder et al.
2015/0348580 A1* 12/2015 van Hoff .............. H04N 13/271
                                                    348/48
2018/0267558 A1* 9/2018 Tiwari ................... H04N 23/90
2019/0021226 A1* 1/2019 Dima .................... A01D 34/008

FOREIGN PATENT DOCUMENTS

| CN | 105991929 | 10/2016 |
| JP | 2010-29135 | 2/2010 |
| JP | 2014117243 | 6/2014 |
| JP | 2015-70799 | 4/2015 |
| JP | 2015186473 | 10/2015 |
| JP | 2017086048 | 5/2017 |
| JP | 2018186728 | 11/2018 |
| WO | 2015049847 | 4/2015 |
| WO | 2017221641 | 12/2017 |

* cited by examiner

IMAGE ACQUISITION DEVICE AND PROCESSING METHOD FOR AGRICULTURAL HARVESTING OPERATION MACHINE

TECHNICAL FIELD

The present disclosure relates to a field of agricultural equipment, and particularly to an image acquisition device and an image processing method for an agricultural harvesting operation machine.

BACKGROUND

In agricultural production, the final work of large-scale planting operations is to harvest crops. For stalk crops, the final harvest work includes cutting, collecting, as well as threshing of the crops. At present, large harvesting equipment is essential for agricultural production. Higher harvesting efficiency can maximize the harvest, and good finishing work is more conducive to subsequent re-seeding or straw recycling. However, the current harvesting equipment is basically a simple cutting machine, in conjunction with a conveying and threshing machine, that simply enlarges and widens a cutter, which still has many shortcomings.

An existing harvesting equipment is mainly composed of a header, a conveyor, a thresher, and a storage bin. Moreover, operation of the harvesting equipment requires manual operations, because areas and rate of harvest are dependent on manual experience. Some harvesting equipment is equipped with a camera, but images are difficult to fully reflect a specific state of the harvesting operation. As illustrated in FIG. 1, in agricultural production, a state of traditional harvesting operations is shown. Positions of the crops to be harvested, positions of the crops that have been harvested, and the states of the crop being harvested are state information required for traditional harvesting. For example, in a farmer's harvesting operation with a sickle, a target of a next harvesting operation is determined from the positions of the crops to be harvested, the positions of the crops that have been harvested is behind, and the cutting positions of the crops being harvested, therefore, it can be said that it is a set of quite intelligent operation process. However, the existing harvesting equipment basically ignores the state information, and performs harvesting operations mechanically, repeatedly, and without differentiation.

Although the existing large harvesting equipment can quickly complete a wide range of operations, efficient operation completion is inseparable from manual experience. It is necessary to manually determine the harvest location and rate of harvesting, and sudden problems also require manual intervention to solve. Unmanned operations are difficult to realize. In addition, the existing harvesting equipment cannot obtain required state information in real time, without the required information of the harvesting operation, correct judgments cannot be made.

In addition, due to particularity of agricultural production, what is required is not only scenes around the machine. In other words, even if the scene images around the machine are acquired, subsequent recognition processing is also required. Algorithms are too costly and time-consuming for agricultural production, for harvesting operations with strong real-time performance, the scenes around the machine are not important. Moreover, unlike distance required by urban traffic, the scene images at longer distances in agricultural production are not of much use, which are merely redundant images of vast land.

Taking into account requirement of large-scale production in the agricultural field, an image acquisition device and an image processing method for agricultural harvesting operation machine are pursued by market.

SUMMARY

The present disclosure provides an image acquisition device and an image processing method for an agricultural harvesting operation machine, in which information required for harvesting operations is fully considered, images of a location of the agricultural harvesting operation machines is acquired, and the acquired images are efficiently processed.

The present disclosure further provides an image acquisition device and an image processing method for an agricultural harvesting operation machine, the acquired images have information about the positions of crops to be harvested, the positions of crops that have been harvested, and the state of crops that are being harvested, so as to assist agricultural harvesting operations.

The present disclosure further provides an image acquisition device and an image processing method for an agricultural harvesting operation machine, the image acquisition device and the image processing method is applied to unmanned agricultural harvesting operations, which reduces production cost and promotes coordination of intelligent information.

The present disclosure further provides an image acquisition device and an image processing method for an agricultural harvesting operation machine, the acquired images and the images that have been processed can represent the state of harvesting operations in real time, production efficiency is improved while using simple and efficient controls.

The present disclosure further provides an image acquisition device and an image processing method for an agricultural harvesting operation machine, the acquired images comprehensively cover an operation area of harvesting operation, so as to acquire the information required for harvesting operation.

The present disclosure further provides an image acquisition device and an image processing method for an agricultural harvesting operation machine, the image processing method can quickly acquire the state of harvesting operation in real time based on effectiveness of the acquired images, which is conducive to the subsequent control.

The present disclosure further provides an image acquisition device and an image processing method for an agricultural harvesting operation machine, the image processing method assists in locating the position of the operating machine, which is conducive to determining a moving position and speed in the subsequent control.

The present disclosure further provides an image acquisition device and an image processing method for an agricultural harvesting operation machine, the acquired images can help to acquire the state of the crops being harvested, which is conducive to adjusting an operation mode of the harvesting operation in real time, and acquiring the maximum harvest benefit.

The present disclosure further provides an image acquisition device and an image processing method for an agricultural harvesting operation machine, with use of the effective acquired images and relatively simple processing methods, the subsequent control can directly respond according to the operation state, which is suitable for unmanned operations.

The present disclosure further provides an image acquisition device and an image processing method for an agricultural harvesting operation machine, the acquired images are suitable for recognition, which is convenient to acquire the required operation information from the image feedback, and can also output a real-time alarm for problems.

The present disclosure further provides an image acquisition device and an image processing method for an agricultural harvesting operation machine, the acquired images have no redundant information, and are acquired for the operation area of agricultural harvesting operations, which makes full use of resources and simplifies the difficulty of processing.

The present disclosure further provides an image acquisition device and an image processing method for an agricultural harvesting operation machine, the acquired images are suitable for remote transmission, which is possible to remotely control the harvesting operation.

The present disclosure further provides an image acquisition device and an image processing method for an agricultural harvesting operation machine, the acquired images are not only suitable for simplified recognition, but also suitable for extracting information, so as to quickly determine the state of the operation machine.

The present disclosure further provides an image acquisition device and an image processing method for an agricultural harvesting operation machine, the image acquisition device and the image processing method do not have high requirements on the operation machine, and can be configured as additional equipment in the machine, so as to promote the evolution of different types of harvesting operation machines.

The present disclosure further provides an image acquisition device and an image processing method for an agricultural harvesting operation machine, the image acquisition device is adaptively configured according to different operation machines, optimally solves the installation configuration, and improves the stability of agricultural production.

The present disclosure further provides an image acquisition device and an image processing method for an agricultural harvesting operation machine, the image acquisition device is suitable for overall management, so that the acquired images are processed collaboratively, the processing process is simplified, and the processing speed is improved.

The present disclosure further provides an image acquisition device and an image processing method for an agricultural harvesting operation machine, intelligent unmanned operation can be realized and supervised according to the preset control program, and combined with the real-time feedback of the image acquisition device.

The present disclosure further provides an image acquisition device and an image processing method for an agricultural harvesting operation machine, the image acquisition device not only has strong adaptability, but also has high effect stability for different types of operation machines, and is suitable for wide application.

The present disclosure further provides an image acquisition device and an image processing method for an agricultural harvesting operation machine, the transformation cost of the operation machine is lower, and more work state is provided for reference control, and comprehensive information assistance is also provided for manual work.

Other features of the present disclosure are fully embodied by the following detailed description and can be implemented by the combination of means and devices specifically pointed out in the appended claims.

According to another aspect of the present disclosure, an agricultural harvesting operation machine, comprising: a machine body and an image capturing assembly; wherein the image capturing assembly is arranged on a surface of the machine body; wherein the machine body is activated for performing harvesting operations, and an operation area is formed in front of the machine body; wherein an acquiring range of the image capturing assembly is arranged on the machine body in a covering manner, and the image capturing assembly acquires images toward the operating area; wherein the machine body comprises a body frame, at least one wheel frame, and a harvesting frame, the harvesting frame is arranged in front of the body frame, the at least one wheel frame is arranged on a bottom of the body frame; and wherein the at least one wheel frame is operated to drive the harvesting frame and the body frame forward to cut and transport crops in front.

According to one embodiment of the present disclosure, the image capturing assembly comprises: at least one acquisition device and a processor; wherein a plurality of acquisition devices of the image capturing assembly are arranged on a front and sides of the body frame with a predetermined orientation; and wherein images acquired by the plurality of acquisition devices processed, summarized, and analyzed by the processor.

According to one embodiment of the present disclosure, the at least one acquisition device is implemented as a panoramic camera.

According to one embodiment of the present disclosure, the at least one acquisition device is implemented as a plurality of wide-angle cameras.

According to one embodiment of the present disclosure, the image capturing assembly comprises three acquisition devices, the three acquisition devices of the image capturing assembly are arranged on the front and the sides of the body frame with the predetermined orientation.

According to one embodiment of the present disclosure, the processor processes the images according to installed positions of the plurality of acquisition devices.

According to one embodiment of the present disclosure, the plurality of acquisition devices comprise: a distant view acquisition device, at least one close view acquisition device, and at least two side view acquisition devices; wherein the distant view acquisition device and the close view acquisition device are adapted to be installed on the front of the body frame, and face above and below the harvesting frame respectively; and wherein the side view acquisition devices are respectively installed on both sides of the body frame, and face both sides of the machine body.

According to one embodiment of the present disclosure, the distant view acquisition device keeps the orientation along an upper side of the wheel frame, and the close view acquisition device keeps the orientation along positions between the wheel frames.

According to one embodiment of the present disclosure, the distant view acquisition device, the close view acquisition device, and the side view acquisition device are respectively numbered according to the installed positions, the processor acquires position of each of the acquisition devices according to each of different numbers, and processes the images according to the positions acquired by the images.

According to one embodiment of the present disclosure, a plurality of the distant view acquisition devices are installed at a certain interval, and a plurality of the close view acquisition devices are installed at a certain interval.

According to one embodiment of the present disclosure, the processor processes the images according to the positions acquired by the images, the images acquired by the close view acquisition devices are preferentially spliced, and the images acquired by other acquisition devices are further spliced.

According to one embodiment of the present disclosure, the processor processes the images according to the positions acquired by the images, the images acquired by the distant view acquisition devices are preferentially spliced, and the images acquired by other acquisition devices are further spliced.

According to one embodiment of the present disclosure, the images acquired by the acquisition devices which are adjacent to each other are preferentially spliced, and the images acquired by other acquisition devices are further spliced.

According to one embodiment of the present disclosure, the images acquired by the distant view acquisition devices and the close view acquisition devices located above and below the harvesting frame are preferentially spliced.

According to one embodiment of the present disclosure, the images acquired by the distant view acquisition devices located below an end of the harvesting frame and the side view acquisition devices located at an edge of the end are preferentially spliced.

According to one aspect of the present disclosure, an agricultural harvesting operation machine, comprising: a machine body and an image capturing assembly; wherein the image capturing assembly comprises an image capturing assembly and a communication device; wherein the image capturing assembly is arranged on a surface of the machine body; and wherein the communication device is communicatively connected with the image capturing assembly, acquires image information from the image capturing assembly, and assists in adjusting an operation position and an operation speed of the machine body.

According to one embodiment of the present disclosure, the communication device uploads information provided by the image capturing assembly for being acquired.

According to one embodiment of the present disclosure, the communication device transmits processed information of the images acquired by the image capturing assembly to a remote control terminal.

According to one embodiment of the present disclosure, the image capturing assembly comprises: at least one acquisition device and a processor; wherein a plurality of acquisition devices of the image capturing assembly are arranged on a front and sides of the body frame with a predetermined orientation; and wherein images acquired by the plurality of acquisition devices processed, summarized, and analyzed by the processor.

According to one embodiment of the present disclosure, the image capturing assembly comprises three acquisition devices, the three acquisition devices of the image capturing assembly are arranged on the front and the sides of the body frame with the predetermined orientation.

According to one embodiment of the present disclosure, the processor processes the images according to installed positions of the plurality of acquisition devices.

According to another aspect of the present disclosure, an image processing method for an agricultural harvesting operation machine comprising: I. acquiring a plurality of images of a front and sides of the machine body; II. splicing the plurality of images according to positions acquired by the images; and III. acquiring state information around the machine body according to a spliced image.

According to one embodiment of the present disclosure, after III, further comprising: transmitting the state information of the machine body remotely.

According to one embodiment of the present disclosure, splicing the plurality of images comprises: processing the acquired images according to installed positions of a plurality of acquisition devices of the machine body.

According to one embodiment of the present disclosure, splicing the plurality of images comprises: splicing preferentially the images acquired by the plurality of acquisition devices with similar orientations.

According to one embodiment of the present disclosure, splicing the plurality of images comprises: splicing preferentially the images acquired by the plurality of acquisition devices which are adjacent to each other.

These and other objectives, features, and advantages of the present disclosure are fully embodied by the following detailed description, drawings, and claims.

DETAILED DESCRIPTION

Figure 1:
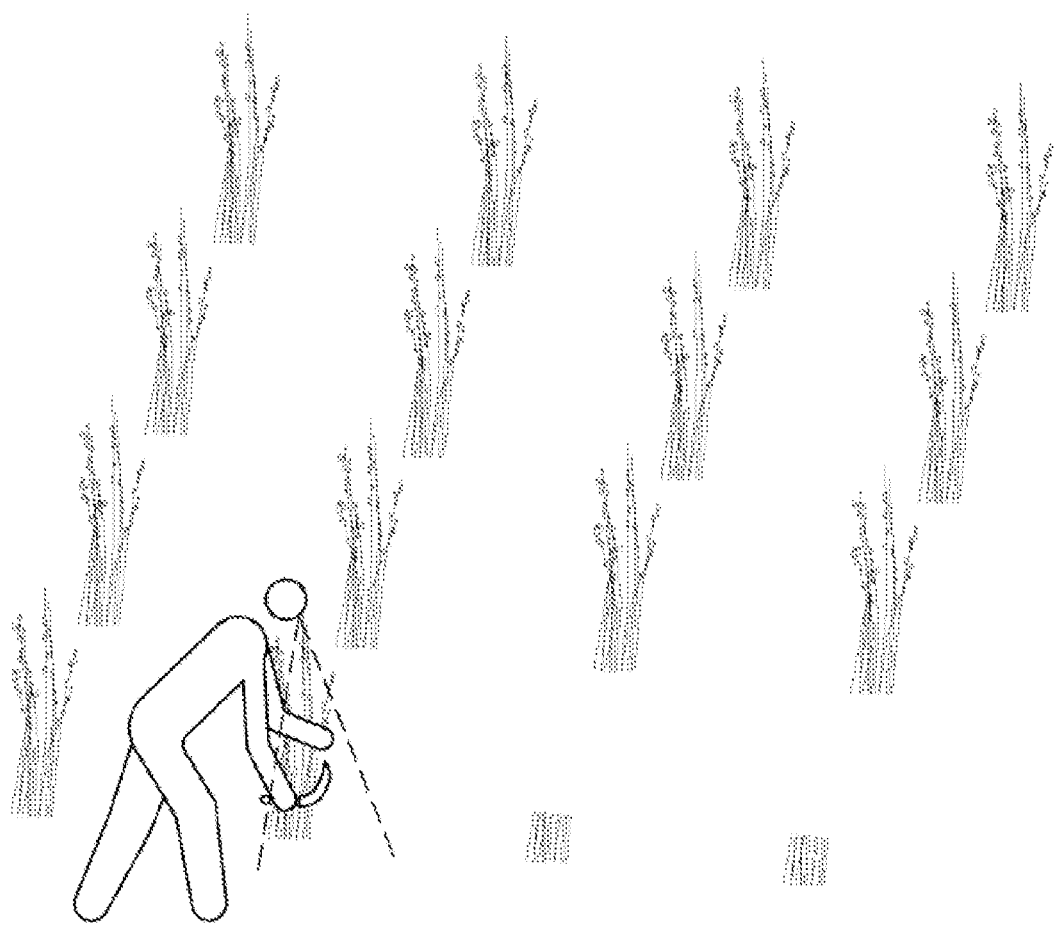
FIG. 1 is a schematic view of a way and a scene of an agricultural harvesting operation.

The following description is used to disclose the present disclosure so that one skilled in the art can implement the present disclosure. The preferred embodiments in the following description are only examples, and one skilled in the art can think of other obvious variations. The basic principles of the present disclosure defined in the following description can be applied to other embodiments, modified embodiments, improvement embodiments, equivalent embodiments, and other technical solutions that do not deviate from the spirit and scope of the present disclosure.

One of ordinary skill in the art should understand that, according to the present disclosure, the orientation or position relationship indicated by the terms "longitudinal", "lateral", "upper", "lower", "front", "rear", "left", "right", "vertical", "horizontal", "top", "bottom", "inner", "outer", etc., is the orientation or position relationship shown in the drawings, which is convenient for describing the present disclosure and simplifying the description, rather than indicating or implying that the referred device or component must have a specific orientation, be constructed and operated in a specific orientation, the above terms should not be understood as limiting the present disclosure.

It can be understood that, the term "a" should be understood as "at least one" or "one or more", that is, in one embodiment, the number of a component may be one, and in another embodiment, the number of the component may also be multiple, the term "one" cannot be understood as a restriction on the number.

The present disclosure provides an image acquisition device and an image processing method for an agricultural harvesting operation machine, to acquire and process state information in agricultural harvesting operations in real time, provide a direct data source for subsequent control and supervision, and provide basis for optimization of operation efficiency.

A preferred embodiment of the present disclosure is illustrated in FIGS. 2-10, the agricultural harvesting operation machine includes a machine body 10 and an image capturing assembly 20, the image capturing assembly 20 is installed on a surface of the machine body 10. As shown in FIGS. 4-9, when the machine body 10 is activated for harvesting operations, an operation area 100 is formed in front of the machine body 10, and the machine body 10 only performs the harvesting operations in the operation area 100. One of ordinary skill in the art can understand that, the harvesting operations of the machine body 10 sequentially performs operations including cutting, conveying, threshing, storing etc. of crops while moving forward. In other words, the operation area 100 of the machine body 10 includes not only crops being harvested, but also crops that have been harvested and crops to be harvested, and the operation area 100 is moveable.

The image capturing assembly 20 is installed on the machine body 10 in a covering manner, and acquires images toward the operating area 100. In other words, an acquiring range of the image capturing assembly 20 covers a front and sides of the machine body 10. It is worth mentioning that, the harvested operations have been saved by the machine body 10. The image capturing assembly 20 acquires the images of the operation area 100 including the crops being harvested and the crops to be harvested. Preferably, in the preferred embodiment, the image capturing assembly 20 is installed on the front and both sides of the machine body 10. That is, the image capturing assembly 20 acquires the images of the operation area 100 in a manner around front of the operation area 100.

It is worth mentioning that, the images acquired by the image capturing assembly 20 basically covers the operating area 100. The images acquired from the image capturing assembly 20 can reflect images around the machine body 10, and after being further processed, the acquired images can express the state information of the operating area 100.

Preferably, the images acquired by the image capturing assembly 20 may be multiple copies, and the images provided by output of the image capturing assembly 20 are one of the multiple copies. More preferably, the output of the image capturing assembly 20 is the state information of the operation area 100. The state of the machine body 10 in operation is acquired according to the images acquired by the image capturing assembly 20.

Figure 2:
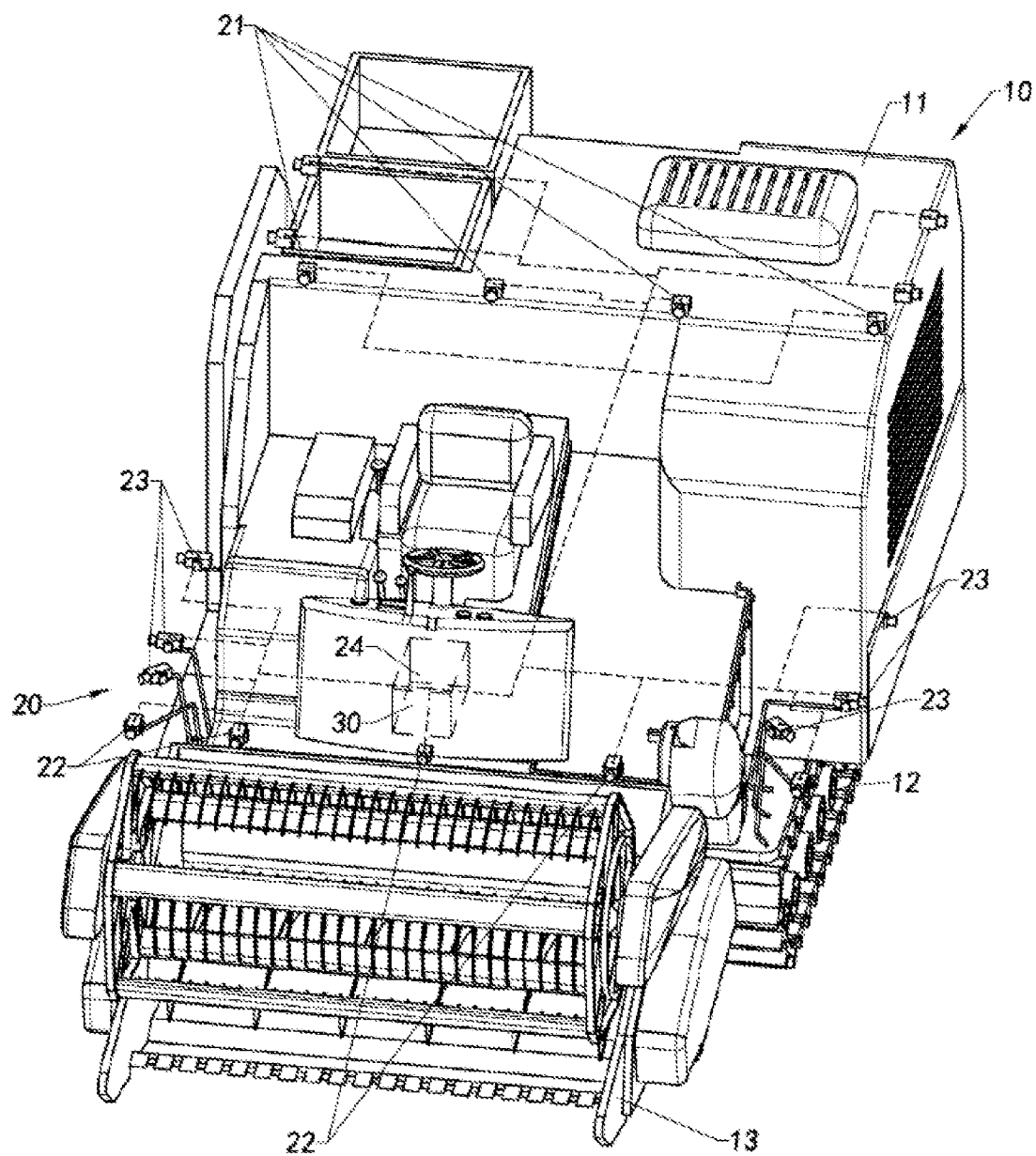
FIG. 2 is an overall schematic view of an image acquisition device for an agricultural harvesting operation machine of a preferred embodiment according to the present disclosure.

Referring to FIG. 2, the image acquisition device includes the image capturing assembly 20 and a communication device 30, the communication device 30 is communicatively connected with the image capturing assembly 20 and acquires image information from the image capturing assembly 20. The image acquisition device is installed in the machine body 10. When the machine body 10 performs the harvesting operations, the image capturing assembly 20 acquires the images of the operating area 100, and the communication device 30 uploads the information provided by the image capturing assembly 20. Preferably, the communication device 30 transmits a copy of images provided by the image capturing assembly 20 to a remote monitoring terminal to ensure real-time transmission. More preferably, the communication device 30 transmits processed information of the image acquired by the image capturing assembly 20 to a remote control terminal to ensure a transmission speed.

In the preferred embodiment, the image capturing assembly 20 is distributed on the front and the sides of the machine body 10. The multiple copies of images acquired by the image capturing assembly 20 are spliced, and then transmitted through the communication device 30.

Figure 3:
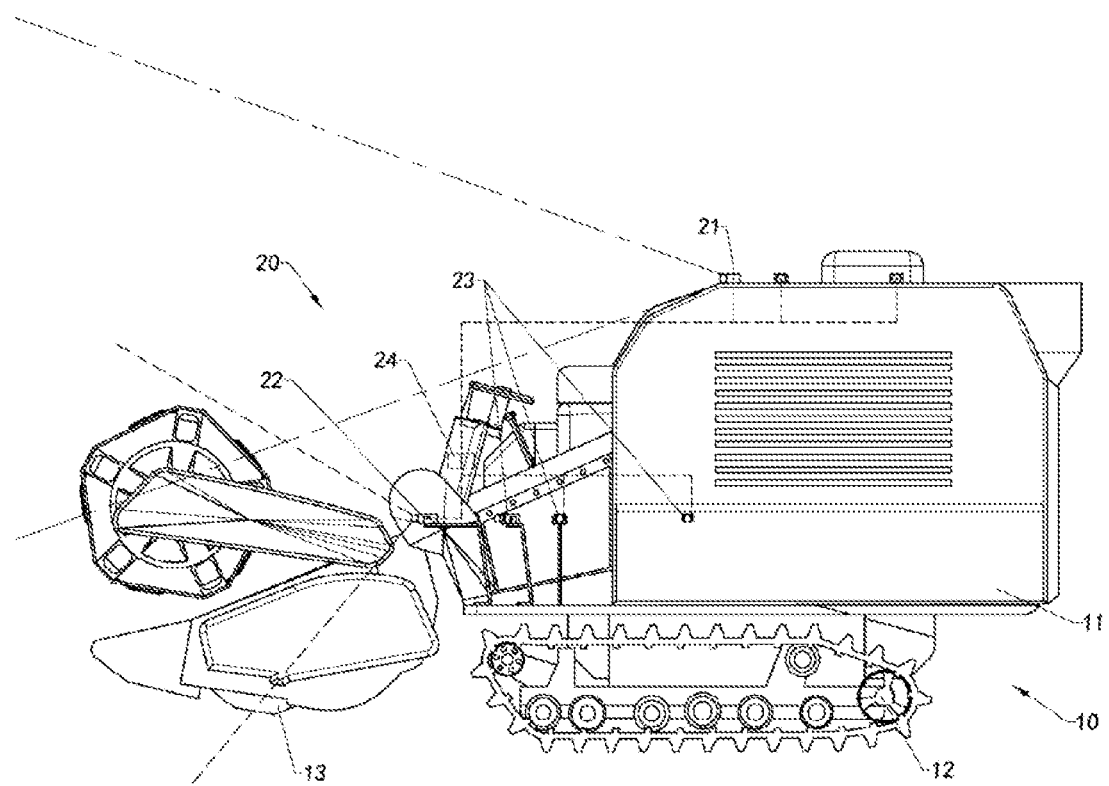
FIG. 3 is a side schematic view of the image acquisition device for the agricultural harvesting operation machine of the above-mentioned preferred embodiment according to the present disclosure.

In detail, as illustrated in FIGS. 2-3, the machine body 10 includes a body frame 11, at least one wheel frame 12, and a harvesting frame 13, the harvesting frame 13 is arranged at a front of the body frame 11, the wheel frame 12 is supported on a bottom of the body frame 11. The wheel frame 12 is operated to drive the harvesting frame 13 and the body frame 11 forward to cut and transport the crops in front. The image acquisition device is arranged on the body frame 11 of the agricultural harvesting operation machine. More specifically, the image capturing assembly 20 is arranged on the body frame 11, and the image capturing assembly 20 acquires the images towards the operating area 100, and avoids acquiring images of the wheel frame 12 and the harvesting frame 13.

Further, in the preferred embodiment, the image capturing assembly 20 includes a number of acquisition devices and a processor 24. The number of acquisition devices of the image capturing assembly 20 are pre-installed on the front and sides of the body frame 11 in a predetermined orientation. The images acquired by the acquisition devices are processed, summarized, and analyzed by the processor 24. Preferably, the processor 24 performs image processing according to the positions where the acquisition devices are installed.

In detail, the acquisition devices may be implemented as a number of wide-angle cameras, or may be implemented as a panoramic camera. In the preferred embodiment, The acquisition devices, as illustrated in FIG. 3, are installed in a distributed manner and classified as a distant view acquisition device 21, at least one close view acquisition device 22, and at least one side view acquisition device 23. The distant view acquisition device 21 and the close view acquisition device 22 are adapted to the body frame 11 and forward facing, and face an upper side and a lower side of the harvesting frame 13 respectively. More specifically, the distant view acquisition device 21 acquires images along the upper side of the wheel frame 12, and the close view acquisition device 22 acquires images along positions between the wheel frame 12 and the wheel frame 12. The side view acquisition devices 23 are respectively installed on both sides of the body frame 11, and acquire images of crop state on both sides.

That is, the images acquired by the distant view acquisition device 21 are related to the state of the crops to be harvested, and the images acquired by the close view acquisition device 22 are related to the crops being harvested. The images acquired by the side view acquisition device 23 are related to the position of the operation area 100.

Preferably, the distant view acquisition device 21, the close view acquisition device 22, and the side view acquisition device 23 are respectively numbered according to the installed positions. The processor 24 acquires the position of the corresponding acquisition device according to each different number, and processes the images according to the acquired positions of the images. Since the processing is based on a position source of the image, the processing speed is increased. Especially for image splicing processing, based on the installed positions of the distant view acquisition device 21, the close view acquisition device 22, and the side view acquisition device 23, the images around the machine body 10 can be acquired quickly, thereby acquiring the state of the operating area 100. In particular, based on different position types of the distant view acquisition device 21, the close view acquisition device 22, and the side view acquisition device 23, the body frame 11, the wheel frame 12, and the harvesting frame 13 in the acquired images can be omitted by default. For example, a lower edge of the image acquired by the distant view acquisition device 21 may be regarded as the harvesting frame 13, and the lower edge is pre-cut or omitted in the processing process. For example, an upper edge of the image acquired by the close view acquisition device 22 can be regarded as the harvesting frame 13, and a lower edge can be regarded as the wheel frame 12, so as to acquire state information of the crop being harvesting. For example, a lower edge of the image acquired by the side view acquisition device 23 can be regarded as the wheel frame 12, so that part of the machine body 10 can be excluded. Therefore, the images acquired by the distant view acquisition device 21, the close view acquisition device 22, and the side view acquisition device 23 are quickly and preliminarily processed and spliced by the processor 24, to acquire the state information of the operation area 100.

Figure 4:
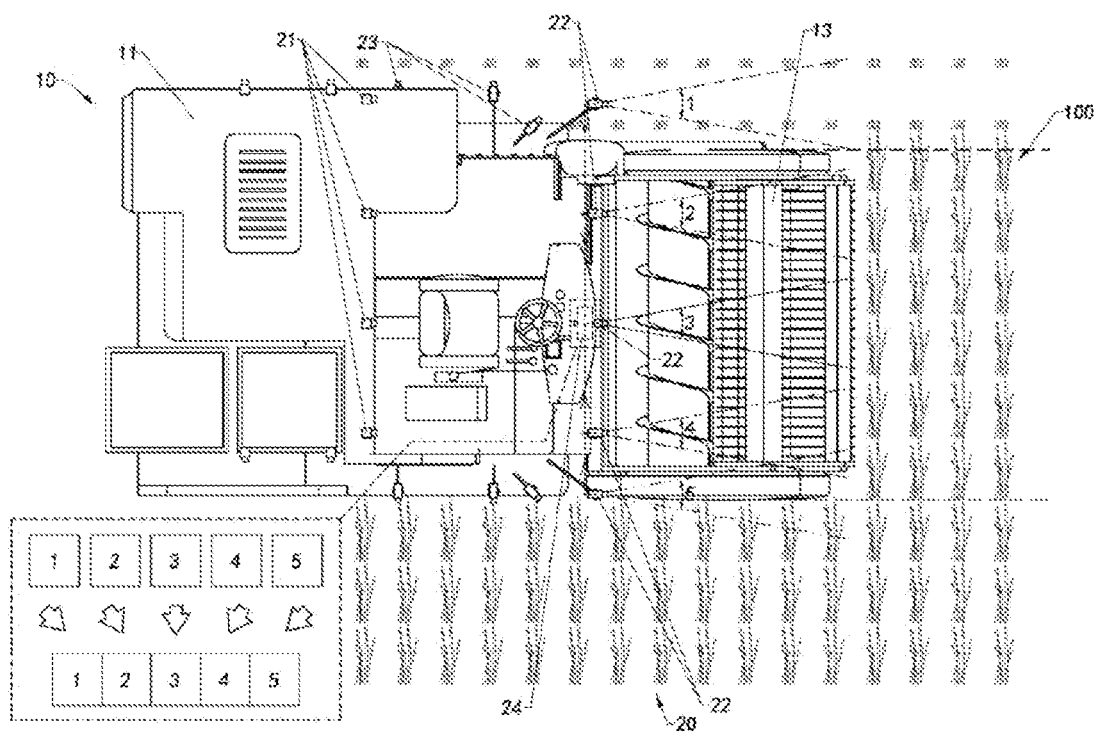
FIG. 4 is a partial schematic view of the image acquisition device for the agricultural harvesting operation machine of the above-mentioned preferred embodiment according to the present disclosure.
Figure 5:
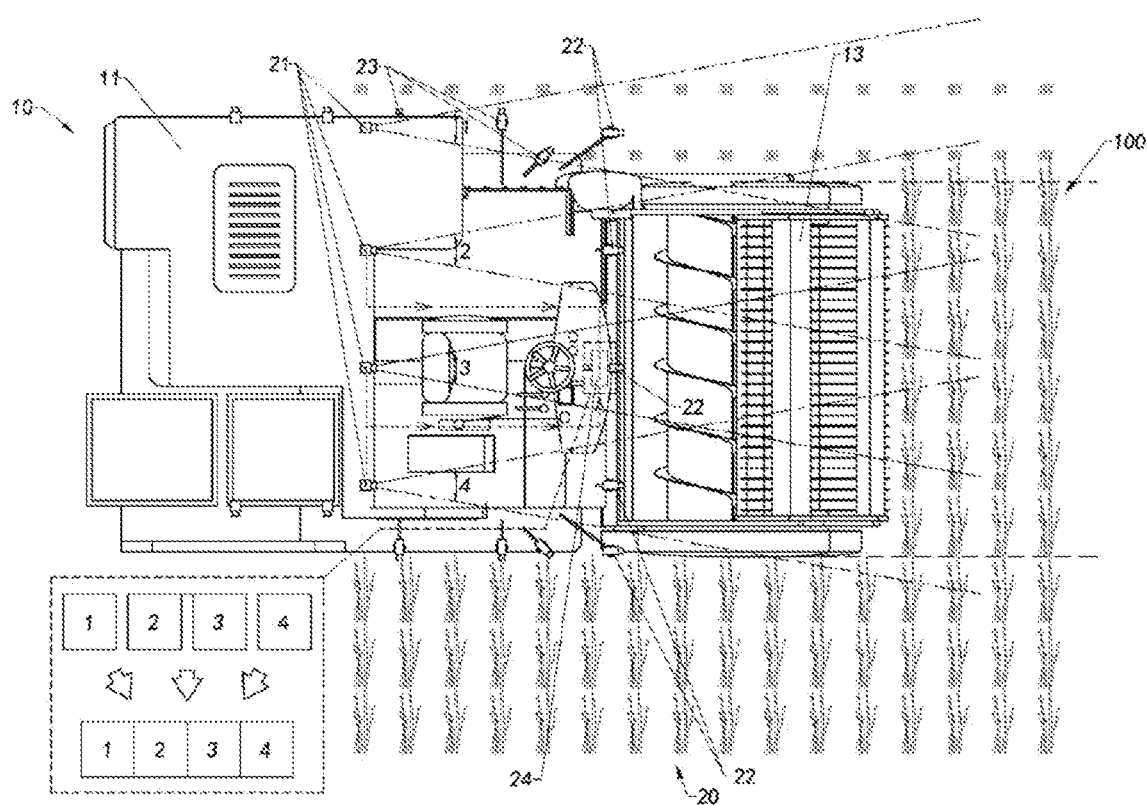
FIG. 5 is a partial schematic view of the image acquisition device for the agricultural harvesting operation machine of the above-mentioned preferred embodiment according to the present disclosure.
Figure 6:
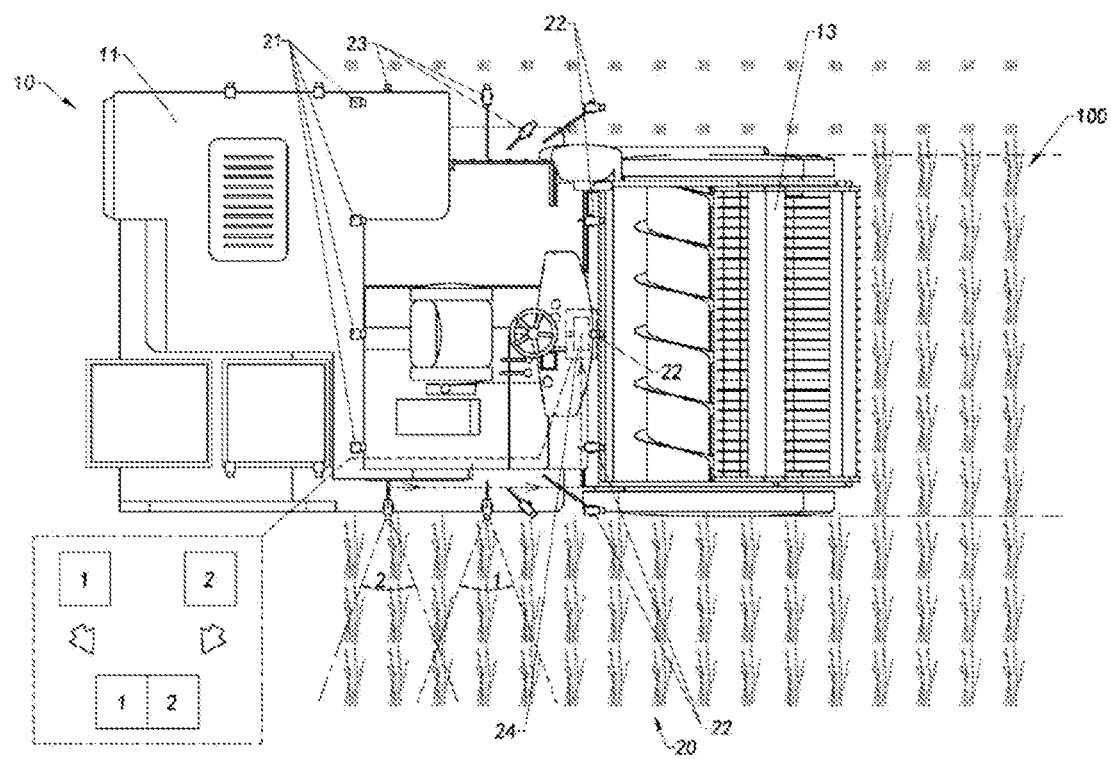
FIG. 6 is a partial schematic view of the image acquisition device for the agricultural harvesting operation machine of the above-mentioned preferred embodiment according to the present disclosure.

In detail, an image processing method of the preferred embodiment is shown in FIGS. 4-6. The image processing method for the agricultural harvesting operation machine includes the following steps:

I. Acquire a number of copies of images of the front and sides of the machine body 10;

II. Splice the images according to positions in the acquired images; and

III. Acquire state information around the machine body 10 according to the spliced image.

In detail, as illustrated in FIG. 5, in the preferred embodiment, a number of the distant view acquisition devices 21 acquires the images toward the upper side of the harvesting frame 13. A number of the distant view acquisition devices 21 are installed at a certain interval, so that the operation area 100 at the front of the machine body 10 is covered. That is, the number of the distant view acquisition devices 21 acquires the images for the crops to be harvested, which is the step I.

Then, according to the installed positions of the number of distant view acquisition devices 21, the acquired images are sequentially spliced, so that the images of the crops to be harvested in front of the harvesting frame 13 are acquired. It is worth mentioning that, unlike the existing image splicing, there is no need to recognize each image to determine content of the image, but to splice a number of images directly according to the installed positions or the harvesting frame 13 in each image. Thus, an overall image of the front of the machine body 10 is acquired, which is the step II.

Then in step III, according to the overall image of the front of the machine body 10 acquired by the distant view acquisition device 21, the operating area 100 in front of the machine body 10 is acquired in real time and state information is represented. Preferably, the acquired images can be further analyzed in detail later.

In detail, as illustrated in FIG. 4, in the preferred embodiment, a number of close view acquisition devices 22 acquires the images between the bottom of the harvesting frame 13 and the wheel frame 12. A number of close view acquisition devices 22 are installed at a certain interval, so that the operation area 100 in the middle of the machine body 10 is covered. That is, a number of close view acquisition devices 22 acquires the images for the crops being harvested, which is step I.

Then, according to the installed positions of the number of close view acquisition devices 22, the acquired images are sequentially spliced, so that the images of the crops being harvested under the harvesting frame 13 are acquired. It is worth mentioning that, unlike the existing image splicing, there is no need to recognize each image to determine content of the image, but to splice a number of images directly according to the installed positions or the harvesting frame 13 in each image. Thus, an overall image of the working machine body 10 is acquired, which is step II.

Then, according to the overall image of the working machine body 10 acquired by the close view acquisition devices 22, a harvesting state of the machine body 10 in the operation area 100 is acquired and represented in real time, which is step III. Preferably, the acquired images can be further analyzed in detail later.

In detail, as illustrated in FIG. 6, in the preferred embodiment, a number of side scene acquisition devices 23 acquire the images toward both sides of the machine body 10. The number of side scene acquisition devices 23 are respectively installed on the left and right sides of the machine body 10, so that the state of the crops on both sides of the machine body 10 can be acquired. That is, generally, the side scene acquisition devices 23 acquire images of a field that has been harvested and a field to be harvested respectively, which is step I.

Then, according to the installed positions of the number of side scene acquisition devices 23, the acquired images are sequentially spliced, so that the images of the field that has been harvested and the field to be harvested are acquired. It is worth mentioning that, unlike existing image splicing, there is no need to recognize each image to determine content of the image, but to directly acquire the state of the crops that have been harvested according to the installed positions, such as the side view acquisition devices 23 installed on the left side of the machine body 10, and to acquire the state of the crops to be harvested according to the side view acquisition devices 23 installed on the right side of the machine body 10, so as to acquire the state of the crops on the left and right sides of the working machine body 10, the position of the machine body 10 is thus determined, which is step II.

Then in step III, according to the images of the sides of the machine body 10 acquired by the side view acquisition devices 23, a forward direction and a speed of the machine body 10 can be acquire, thereby ensuring accuracy of the forward direction of harvesting, and helping improve harvesting efficiency.

Figure 7:
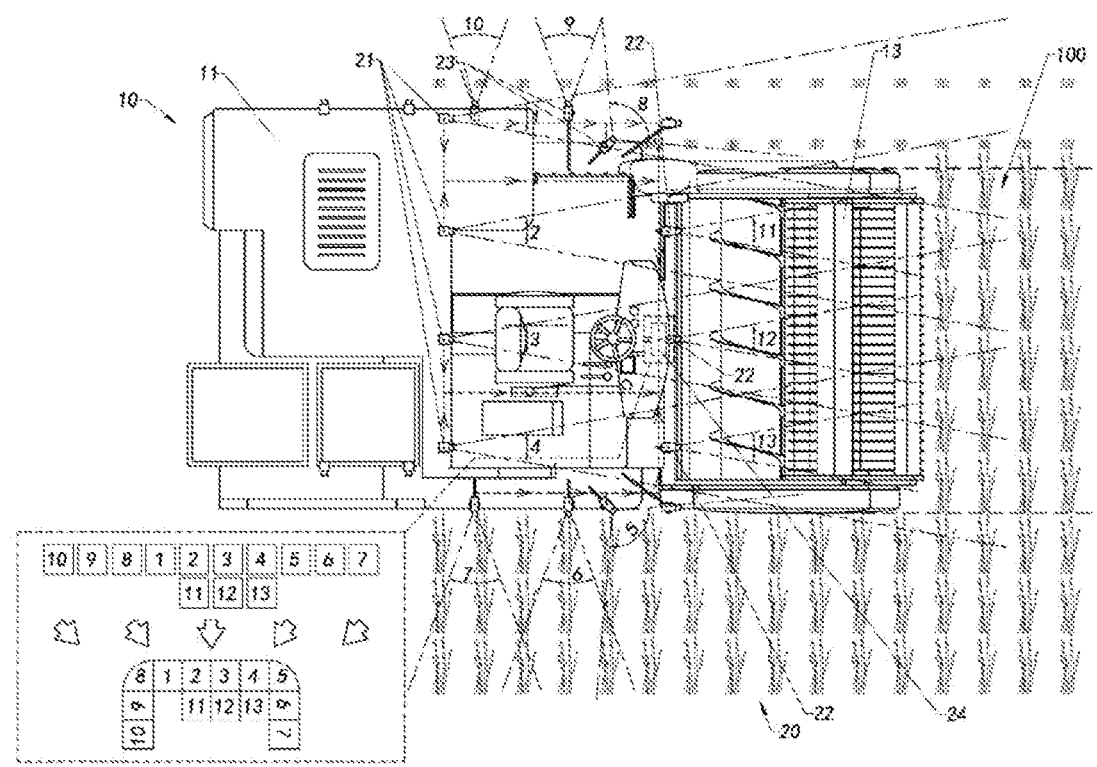
FIG. 7 is a flowchart of an image processing method for the agricultural harvesting operation machine of the above-mentioned preferred embodiment according to the present disclosure.

Furthermore, the images acquired by the distant view acquisition devices 21, the close view acquisition devices 22, and the side view acquisition devices 23 are finally spliced together, to acquire the image of the machine body 10 in the operation area 100. As illustrated in FIG. 7, the state of the three sides of the machine body 10 is comprehensively acquired. Preferably, the image capturing assembly 20 finally obtains an observation angle similar to that of the machine body 10 from top to bottom, which includes the crops being harvested, the crops to be harvested, and the position of the harvesting operation in the field.

Further, the image processing method, after step III, further includes the steps:

Transmit the state information of the machine body 10 remotely.

Figure 10:
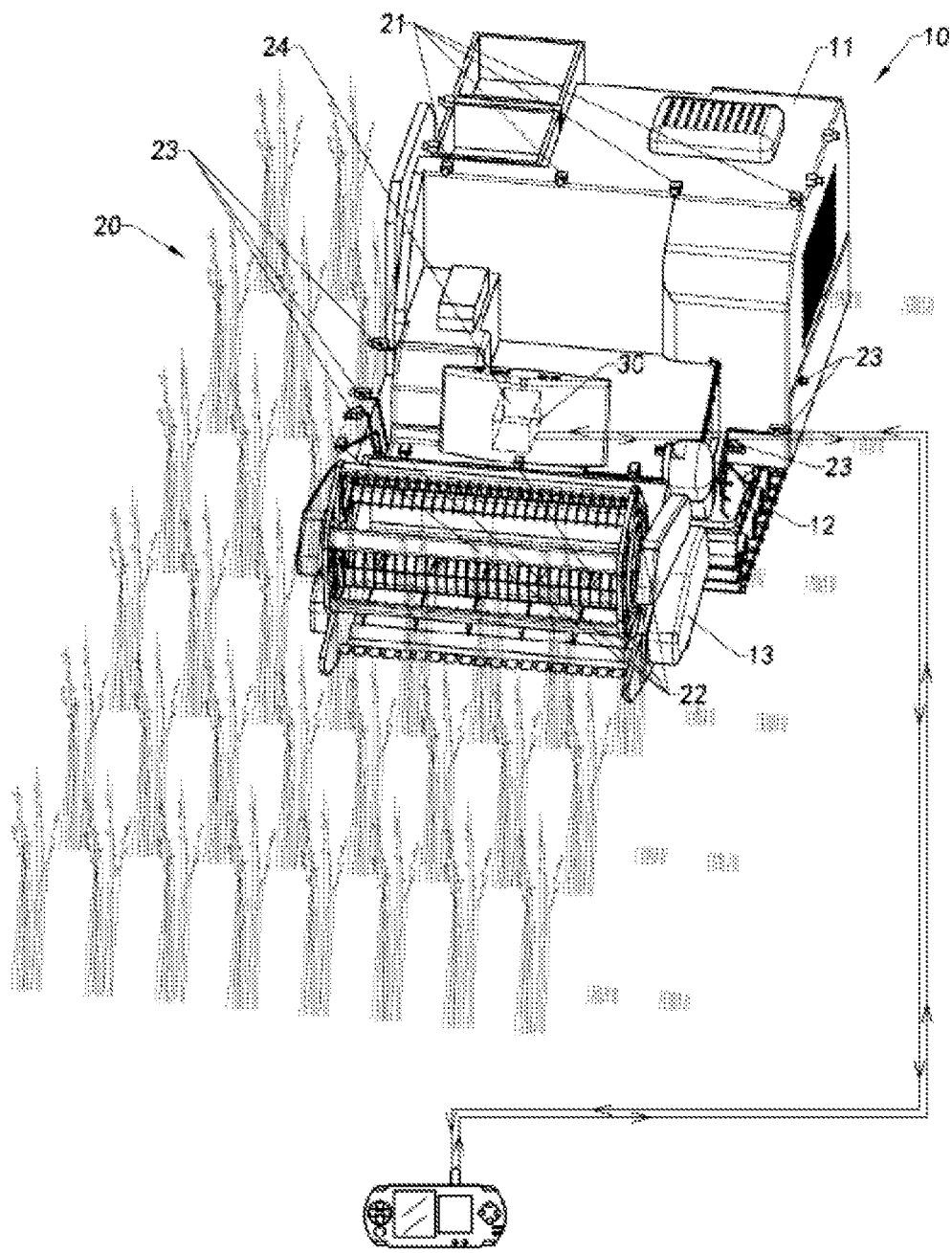
FIG. 10 is an application schematic view of the image acquisition device and the image processing method for the agricultural harvesting operation machine of the above-mentioned preferred embodiment according to the present disclosure.

As illustrated in FIG. 10, an operation state of the machine body 10 can be acquired remotely. Further, the machine body 10 is remotely controlled for parameters in the harvesting operation. For example, a certain difference between the crops and the harvesting frame 13 is determined according to the images acquired by the close view acquisition devices 22 and the side view acquisition device 23, that is, the operation of the machine body 10 is relatively deviated from a required crop area, the harvesting frame 13 is required to be fully filled, to achieve high-efficiency harvesting. More specifically, for example, 80% of the left side of the harvesting frame 13 is determined to be harvesting crops according to the feedback image, then the state information can be acquired remotely, and the forward direction of the machine body 10 can be adjusted to the left, so that the harvesting frame 13 can fully cover the crops to be harvested.

Of course, operation adjustments of the machine body 10 can be manually operated remotely, or can be adjusted by a predetermined program, and the images acquired by the image acquisition device can help control so as to realize unmanned agricultural production.

Figure 8:
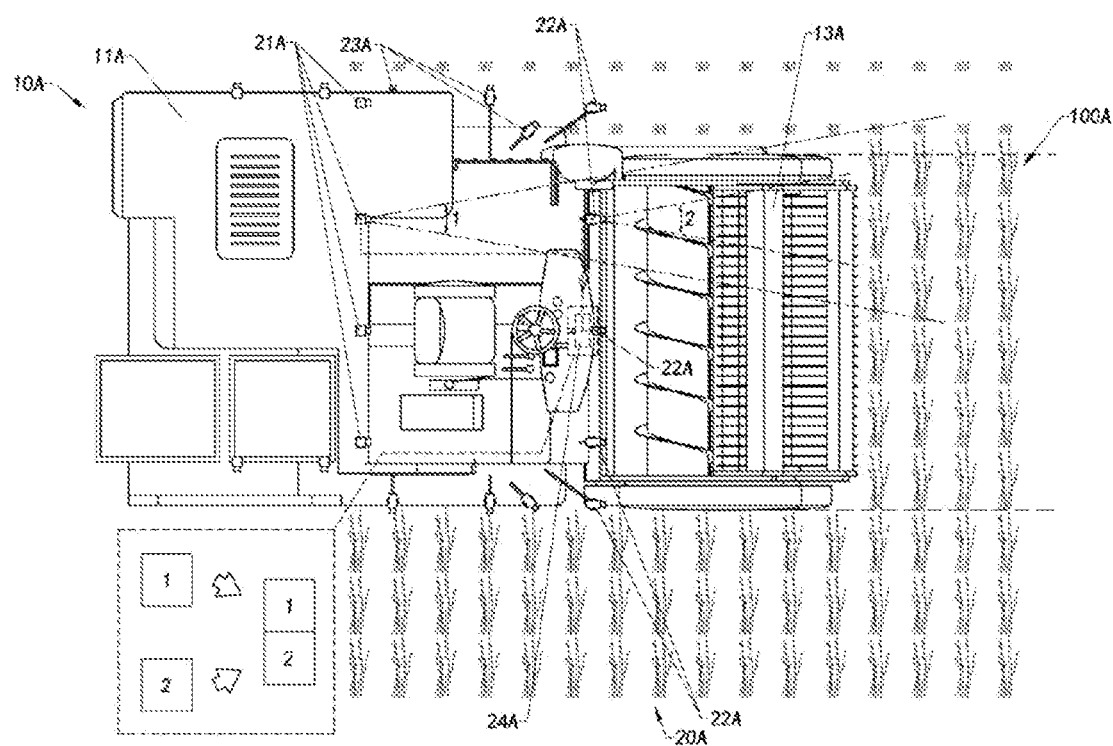
FIG. 8 is a partial flowchart of the image processing method for the agricultural harvesting operation machine in another way of the above-mentioned preferred embodiment according to the present disclosure.
Figure 9:
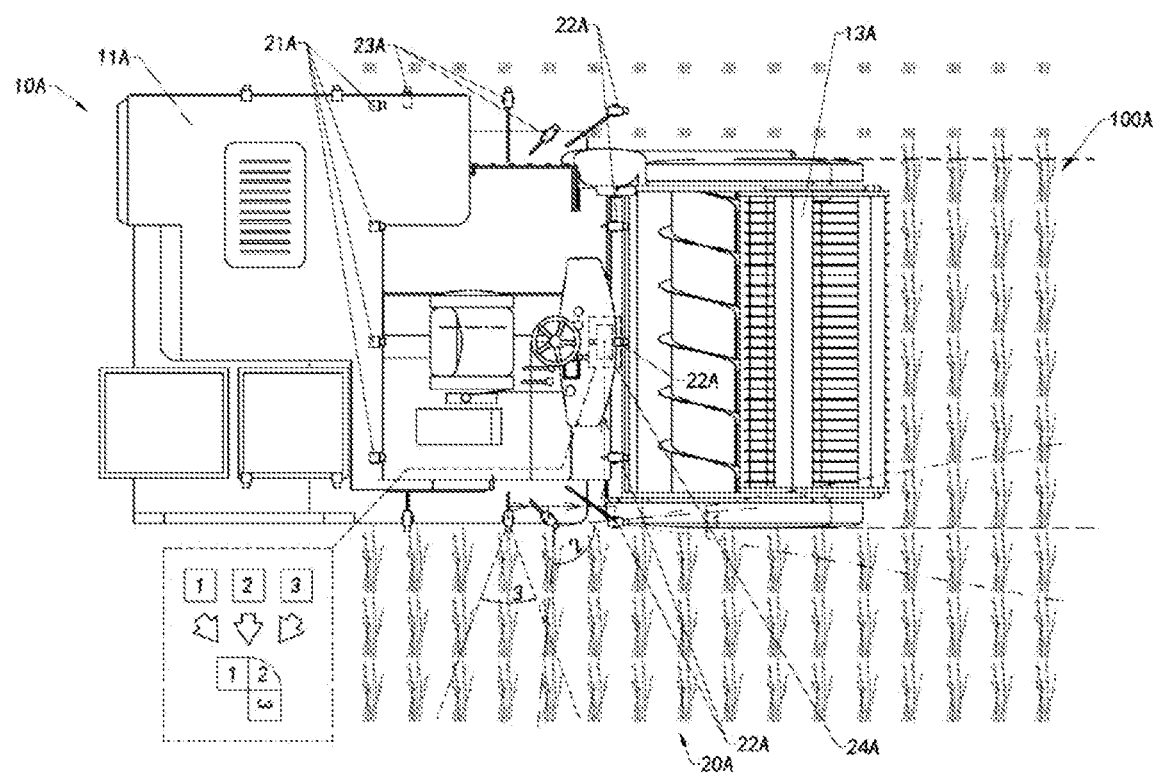
FIG. 9 is a partial flowchart of the image processing method for the agricultural harvesting operation machine in the above-mentioned way of the above-mentioned preferred embodiment according to the present disclosure.

An image acquisition device for an agricultural harvesting operation machine of another feasible way of the above-mentioned preferred embodiment of the present disclosure is set forth, as illustrated in FIGS. 8-9, the agricultural harvesting operation machine includes a machine body 10A and an image capturing assembly 20A, structures of the machine body 10A and the image capturing assembly 20A are similar with the machine body 10 and the image capturing assembly 20 of the agricultural harvesting operation machine in the above-mentioned preferred embodiment, and is not repeated in the present disclosure.

The difference from the above-mentioned embodiment is that, FIGS. 4-6 illustrate image splicing according to the same installed positions, and finally three different distant view acquisition devices 21A, close view acquisition device 22A, and side view acquisition devices 23A composite the final image. In the embodiment, according to the positions of the distant view acquisition device 21A, the close view acquisition device 22A, and the side view acquisition device 23A, the images acquired by the acquisition devices with similar positions are preferably spliced, and then subsequently processed to be the final image.

The images acquired by the distance view acquisition device 21A and the close view acquisition device 22A located at the upper side and the lower side of the harvesting frame 13A are spliced first. As illustrated in FIG. 8, the installed positions of a number of distance view acquisition devices 21A and a number of close view acquisition devices 22A are considered to be adjacent to each other. In other words, the distant view acquisition devices 21A and the close view acquisition devices 22A acquire images of the crops to be harvested and the crops being harvested at the same position relative to the harvesting frame 13A, which is the step I.

Then, according to the installed positions of the distant view acquisition device 21A and the close view acquisition device 22A located above and below the harvesting frame 13A, the acquired images are sequentially spliced, so that the images of the upper side and the lower side of the harvesting frame 13A are acquired. It is worth mentioning that, unlike the existing image splicing, there is no need to recognition each image to determine content of the image, but directly to acquire an overall image of the crops before and after being cut at a certain position of the machine body 10A according to the installed positions, which is the step II.

Then in step III, according to an image of a certain position of the machine body 10A, the operation area 100A in front of the machine body 10A is acquired in real time and the state information is represented. Preferably, the acquired images can be further analyzed in detail later, which are similar to a viewing angle of traditional manual cutting.

In addition, The images acquired by the close view acquisition device 22A located below an end of the harvesting frame 13A and the side view acquisition device 23A located at an edge of the end of the harvesting frame 13A are spliced first. As illustrated in FIG. 9, the installed positions of the side view acquisition devices 23A and a number of close view acquisition devices 22A are considered to be adjacent to each other. That is, the side view acquisition device 23A and the close view acquisition device 22A acquire images of the crops being harvested and the crops that have been harvested located the end of the harvesting frame 13A, which is the step I.

Then, according to the installed positions of the close view acquisition device 22A located below the end of the harvesting frame 13A and the side view acquisition device 23A located at the edge of the end, the acquired images are sequentially spliced, so that the images of the end of the harvesting frame 13A are acquired. It is worth mentioning that, unlike the existing image splicing, there is no need to recognize each image to determine content of the image, but to directly acquire an overall image of the crops before and after being cut at a certain position of the machine body 10A according to the installed positions, which is the step II.

Then in step III, according to the overall image of the certain position of the machine body 10A, the operating area 100A in front of the machine body 10A is acquired in real time and the state information is represented. Preferably, the acquired images can be further analyzed in detail later, which are similar to the viewing angle of traditional manual cutting. In the embodiment, an edge working state of the machine body 10A is further acquired, which is convenient for assisting in adjusting the operation position and the operation speed of the machine body 10A.

It is worth mentioning that, the images acquired by all the acquisition devices, including the distant view acquisition device 21A, the close view acquisition device 22A, and the side view acquisition device 23A, are finally spliced together, so as to acquire an image of the operation area 100A of the machine body 10A. As illustrated in FIG. 7, the state before and after operation of the machine body 10A is comprehensively acquired. Preferably, the image capturing assembly 20A finally acquire an observation angle similar to that of the machine body 10A from top to bottom, including the crops being harvested, the crops to be harvested, and the position of the harvesting operation in the field.

As illustrated in FIG. 10, the working state of the machine body 10A in the embodiment can be acquired remotely. Further, the machine body 10A is remotely controlled for parameters in the harvesting operation. For example, a certain difference between the crops and the harvesting frame 13 is determined according to the images acquired by the close view acquisition devices 22A and the side view acquisition device 23A, that is, the operation of the machine body 10 is relatively deviated from a required crop area, the harvesting frame 13 is required to be fully filled, to achieve high-efficiency harvesting. More specifically, for example, the crops that are not harvested at the left side of the harvesting frame 13 are determined and displayed in the side view acquisition device 23A according to the feedback image, then the state information can be acquired remotely, and the forward direction of the machine body 10 can be adjusted to the left, so that the harvesting frame 13 can fully cover the crops to be harvested.

One of ordinary skill in the art should understand that, the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the embodiments of the present disclosure may have any deformation or modification.

What is claimed is:

1. An agricultural harvesting operation machine, comprising:
    a machine body and an image capturing assembly;
    wherein the image capturing assembly is arranged on a surface of the machine body, and comprises a plurality of acquisition devices and a processor:
        wherein the plurality of acquisition devices comprise a distant view acquisition device, at least one close view acquisition device, and at least two side view acquisition devices;
        wherein the distant view acquisition device and the at least one close view acquisition device are adapted to be arranged on a body frame of the machine body forward facing, and face above and below a harvesting frame of the machine body respectively; and
        wherein the side view acquisition devices are respectively arranged on both sides of the body frame, and face away from both sides of the machine body; and
        wherein images acquired by the plurality of acquisition devices are processed, summarized, and analyzed by the processor, the distant view acquisition device, the at least one close view acquisition device, and the at least two side view acquisition device are respectively numbered according to arranged positions, the processor acquires a position of each of the plurality of acquisition devices according to each number, the images acquired by any two of the plurality of acquisition devices which are adjacent to each other are firstly spliced according to the acquired position of each of the plurality of acquisition devices, and the firstly spliced images are further spliced to an overall image of front of the machine body;
    wherein an operation area is formed in the front of the machine body in response that the machine body is activated for performing harvesting operations;
    wherein an acquiring range of the image capturing assembly is arranged on the machine body in a covering manner, and the image capturing assembly acquires the images toward the operating area;
    wherein the machine body comprises the body frame, the harvesting frame, and at least one wheel frame, the harvesting frame is arranged in front of the body frame, the at least one wheel frame is supported on a bottom of the body frame; and
    wherein the at least one wheel frame is operated to drive the harvesting frame and the body frame forward to cut and transport crops in front.

2. The agricultural harvesting operation machine according to claim 1, wherein at least one of the plurality of acquisition devices is implemented as a panoramic camera.

3. The agricultural harvesting operation machine according to claim 1, wherein at least one of the plurality of acquisition devices is implemented as a wide-angle camera.

4. The agricultural harvesting operation machine according to claim 1, wherein the distant view acquisition device keeps an orientation along an upper side of the at least one wheel frame, and the at least one close view acquisition device keeps an orientation along positions between the at least one wheel frame.

5. The agricultural harvesting operation machine according to claim 1, wherein the distant view acquisition device is arranged at a certain interval, and the at least one close view acquisition device is arranged at another certain interval.

6. The agricultural harvesting operation machine according to claim 1, wherein the processor processes the images according to the arranged positions of the plurality of acquisition devices, the images acquired by the at least one close view acquisition devices are firstly spliced, and the images acquired by other acquisition devices are further spliced.

7. The agricultural harvesting operation machine according to claim 1, wherein the processor processes the images according to the arranged positions of the acquisition devices, the images acquired by the distant view acquisition device are firstly spliced, and the images acquired by other acquisition devices are further spliced.

8. The agricultural harvesting operation machine according to claim 1, wherein the images acquired by the distant view acquisition device and the at least one close view acquisition device located above and below the harvesting frame are firstly spliced.

9. The agricultural harvesting operation machine according to claim 1, wherein the images acquired by the distant view acquisition device located below an end of the harvesting frame and the at least two side view acquisition devices located at an edge of the end are firstly spliced.

10. An agricultural harvesting operation machine, comprising:
    a machine body and an image acquisition device;
    wherein the image acquisition device comprises an image capturing assembly and a communication device;
    wherein the image capturing assembly is arranged on a surface of the machine body, and comprises a plurality of acquisition devices and a processor:

wherein the plurality of acquisition devices comprise a distant view acquisition device, at least one close view acquisition device, and at least two side view acquisition devices;

wherein the distant view acquisition device and the at least one close view acquisition device are adapted to be arranged on a body frame of the machine body forward facing, and face above and below a harvesting frame of the machine body respectively; and wherein the side view acquisition devices are respectively arranged on both sides of the body frame, and face away from both sides of the machine body; and wherein images acquired by the plurality of acquisition devices are processed, summarized, and analyzed by the processor, the distant view acquisition device, the at least one close view acquisition device, and the at least two side view acquisition device are respectively numbered according to arranged positions, the processor acquires a position of each of the plurality of acquisition devices according to each number, the images acquired by any two of the plurality of acquisition devices which are adjacent to each other are firstly spliced according to the acquired position of each of the plurality of acquisition devices, and the firstly spliced images are further spliced to an overall image of front of the machine body; and wherein the communication device is communicatively connected with the image capturing assembly, acquires image information from the image capturing assembly, and assists in adjusting an operation position and an operation speed of the machine body.

11. The agricultural harvesting operation machine according to claim 10, wherein the communication device uploads information provided by the image capturing assembly.

12. The agricultural harvesting operation machine according to claim 10, wherein the communication device transmits the image information of the images acquired by the image capturing assembly to a remote control terminal.

13. An image processing method for an agricultural harvesting operation machine comprising:

acquiring a plurality of images of a front and sides of a machine body by an image capturing assembly, wherein the image capturing assembly comprises a plurality of acquisition devices and a processor, the plurality of acquisition devices comprise a distant view acquisition device, at least one close view acquisition device, and at least two side view acquisition devices, the distant view acquisition device and the at least one close view acquisition device are adapted to be arranged on a body frame of the machine body forward facing, and face above and below a harvesting frame of the machine body respectively, the side view acquisition devices are respectively arranged on both sides of the body frame, and face away from both sides of the machine body;

splicing the plurality of images according to positions acquired by the plurality of images, wherein the plurality of images are processed, summarized, and analyzed by the processor, the distant view acquisition device, the at least one close view acquisition device, and the at least two side view acquisition device are respectively numbered according to arranged positions, the processor acquires a position of each of the plurality of acquisition devices according to each number, the images acquired by any two of the plurality of acquisition devices which are adjacent to each other are firstly spliced according to the acquired position of each of the plurality of acquisition devices, and the firstly spliced images are further spliced to an overall image of front of the machine body; and acquiring state information around the machine body according to the spliced image.

14. The image processing method according to claim 13, the method further comprising:

transmitting the state information of the machine body remotely.

* * * * *